(12) United States Patent
Varadaraj

(10) Patent No.: US 6,569,815 B2
(45) Date of Patent: May 27, 2003

(54) COMPOSITION FOR AQUEOUS VISCOSIFICATION

(75) Inventor: Ramesh Varadaraj, Flemington, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 93 days.

(21) Appl. No.: 09/819,274

(22) Filed: Mar. 28, 2001

(65) Prior Publication Data

US 2002/0026000 A1 Feb. 28, 2002

Related U.S. Application Data

(60) Provisional application No. 60/227,914, filed on Aug. 25, 2000.

(51) Int. Cl.[7] .............................. C09K 3/00; C08K 5/01; C08K 3/34
(52) U.S. Cl. ................ 507/269; 507/901; 507/213; 507/224; 507/225; 524/62; 524/63; 524/447; 524/492; 524/493
(58) Field of Search ................................. 507/901, 140, 507/270, 213, 224, 225, 269; 524/62, 63, 447, 492, 493

(56) References Cited

U.S. PATENT DOCUMENTS

| | | | |
|---|---|---|---|
| 2,960,465 A | * 11/1960 | Brink | 507/901 |
| 4,432,881 A | 2/1984 | Evani | 252/8.5 A |
| 4,702,319 A | 10/1987 | Bock et al. | 166/275 |
| 4,709,759 A | 12/1987 | Bock et al. | 166/275 |
| 4,770,796 A | * 9/1988 | Jacobs | 507/901 |
| 4,881,473 A | * 11/1989 | Skinner | 110/224 |
| 2001/0049902 A1 | * 12/2001 | Varadaraj et al. | 44/301 |

* cited by examiner

Primary Examiner—Philip Tucker
(74) Attorney, Agent, or Firm—Estelle C. Bakun; Ramesh Varadaraj

(57) ABSTRACT

The invention includes a composition of matter for increasing the viscosity of an aqueous fluid and for recovering oil from a subterranean formation. It also includes methods for making and using the composition.

25 Claims, 2 Drawing Sheets

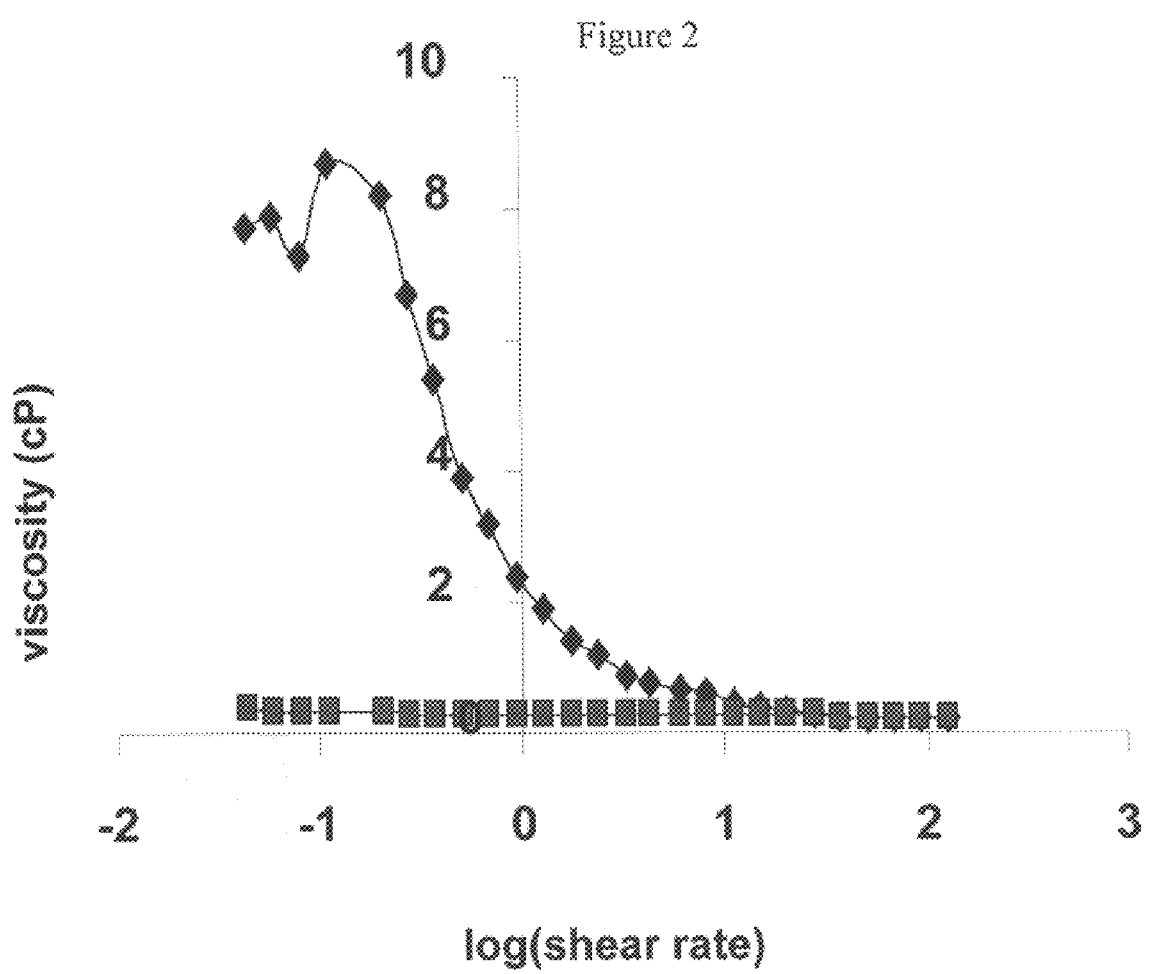

COMPOSITION FOR AQUEOUS VISCOSIFICATION

This application is based on a Provisional of U.S. Serial No. 60/227,914 filed Aug. 25, 2000.

FIELD OF THE INVENTION

An aspect of the invention is directed to a composition for increasing the viscosity of an aqueous fluid.

Another aspect of the invention is directed to a method for increasing the viscosity of an aqueous fluid.

Another aspect of the invention is directed to producing hydrocarbons from a subterranean hydrocarbon formation.

BACKGROUND OF THE INVENTION

The use of water soluble polymers and surfactants to increase the viscosity of water is of importance in many applications ranging from improved oil recovery, metal working fluid lubrication, and gellants in the food industry. In a polymer flood, for improved crude oil recovery water-soluble polymers like Xanthan gum and polyacrylic acid derivatives are used to obtain optimum mobility ratios. These polymers in combination with surfactants are known to increase the viscosity of produced brine. The main drawback with the use of surfactants is that they are expensive chemicals and particularly in oil recovery operations tend to deplete in the reservoir due to their adsorption on mineral surfaces. Hence, there is a continuing need for improved compositions for enhanced aqueous viscosification.

It is well known that a significant percentage of oil remains in a subterranean formation after the costs of primary production rise to such an extent that further oil recovery is cost ineffective. Typically, only one-fifth to one-third of the original oil in place is recovered during primary production. At this point, a number of enhanced oil recovery (EOR) procedures can be used to further recover the oil in a cost-effective manner. These procedures are based on re-pressuring or maintaining oil pressure and/or mobility.

For example, waterflooding of a reservoir is a typical method used in the industry to increase the amount of oil recovered from a subterranean formation. Waterflooding involves simply injecting water into a reservoir, typically through an injection well. The water serves to displace the oil in the reservoir to a production well. However, when waterflooding is applied to displace very viscous heavy oil from a formation, the process is very inefficient because the oil mobility is much less than the water mobility. The water quickly channels through the formation to the producing well, bypassing most of the oil and leaving it unrecovered. Consequently, there is a need to either make the water more viscous, or use another drive fluid that will not channel through the oil.

For moderately viscous oils, i.e., those having viscosities of approximately 20–100 centipoise (cP), water-soluble polymers such as polyacrylamides or xanthan gum have been used to increase the viscosity of the water injected to displace oil from the formation. For example, polyacrylamide was added to water used to waterflood a 24 cP oil in the Sleepy Hollow Field, Nebr. Polyacrylamide was also used to viscosify water used to flood a 40 cP oil in the Chateaurenard Field, France. With this process, the polymer is dissolved in the water, increasing its viscosity. While water-soluble polymers can be used to achieve a favorable mobility waterflood for low to moderately viscous oils, usually they cannot economically be applied to achieving a favorable mobility displacement of more viscous oils, i.e., those having viscosities of approximately 100 cP or higher. These oils are so viscous that the amount of polymer needed to achieve a favorable mobility ratio would usually be uneconomic. Further, as known to those skilled in the art, polymer dissolved in water often is desorbed from the drive water onto surfaces of the formation rock, entrapping it and rendering it ineffective for viscosifying the water. What is needed in the art is a composition capable of overcoming the shortfalls of the prior art.

BRIEF DESCRIPTION OF THE FIGURES

FIG. 2 depicts the influence of 700 ppm surface modified clay on the viscosity of water at 25° C. The diamonds are the surface modified clay and the squares are Xanthan polymer alone.

SUMMARY OF THE INVENTION

Figure 1:
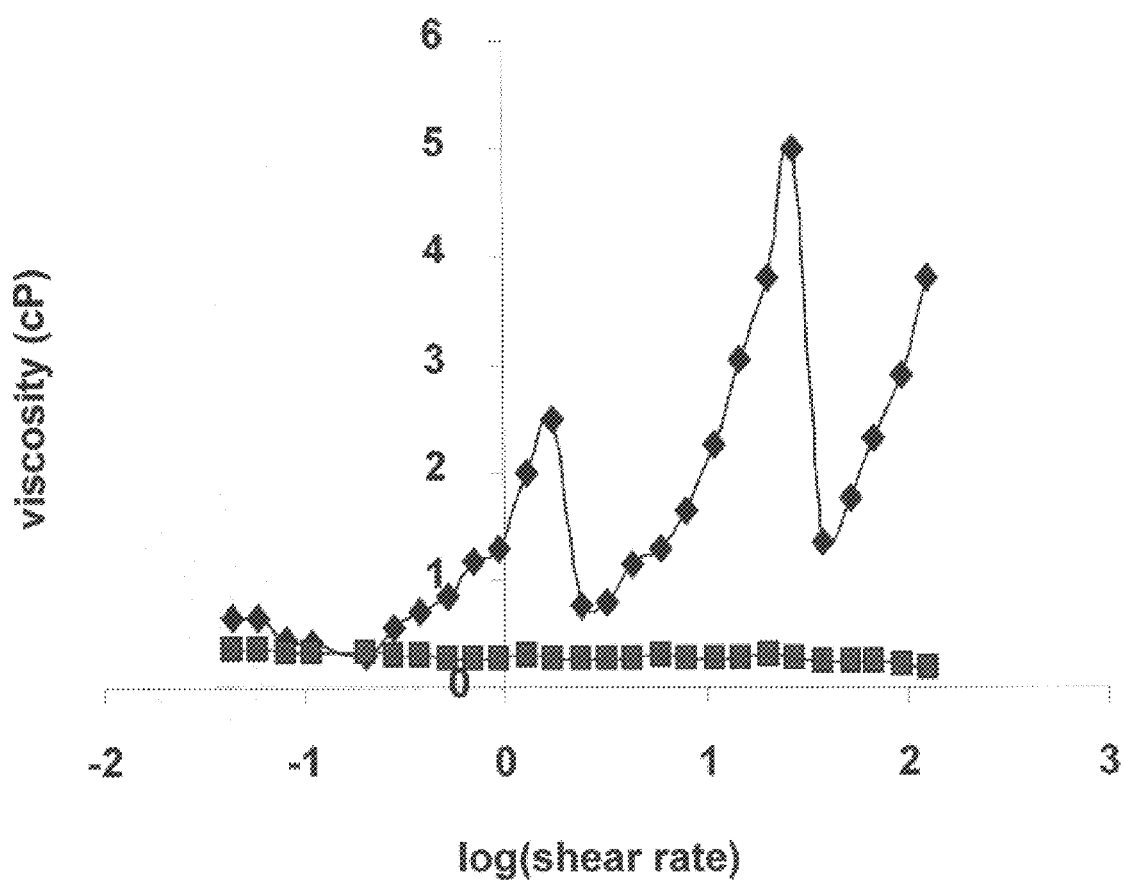
FIG. 1 shows the viscosity at 25° C. as a function of shear rate of 280 ppm surface modified clay on the viscosity of 250 ppm Xanthan polymer solution. The squares are the Xanthan alone and the diamonds the Xanthan polymer plus the modified clay solid.

An aspect of the invention is directed to a composition comprising a combination of a water-soluble polymer and surface modified solids wherein said surface modified solids have adsorbed thereon air oxidized polars of a heavy oil.

Another aspect of the invention is directed to the above composition further comprising an aqueous fluid.

Another aspect of the invention is directed to a method for increasing the viscosity of an aqueous fluid comprising water comprising the steps of adding to said fluid a water soluble polymer and surface modified solids wherein said surface modified solids have adsorbed thereon polar air oxidized hydrocarbons of a heavy oil.

The invention also includes a method of producing a composition of matter said method comprising (a) thermally treating a mixture of heavy oil and solids wherein said solids have a total surface area of about 1500 square microns or less in the presence of oxygen for a time and at a temperature sufficient to produce oxidized polars from said heavy oil and to allow said oxidized polars to adsorb onto the surface of said solids wherein said adsorption achieves at least 50% coverage (b) combining at least a portion of said as produced surface modified solids and said heavy oil following step (a) with a water soluble polymer and optionally an aqueous fluid.

The invention further includes a method for recovering hydrocarbons from a subterranean formation, said method comprising the steps of:

(a) Injecting into said subterranean formation a composition comprising an aqueous fluid comprising water, a water soluble polymer and surface modified solids, wherein said surface modification comprised polar air oxidized hydrocarbons of a heavy oil adsorbed onto the surface of said solids;

(b) recovering hydrocarbons form said subterranean hydrocarbon formation; and wherein said composition has a viscosity at least two times greater than the viscosity of the hydrocarbons being recovered from said subterranian hydrocarbon formation.

DETAILED DESCRIPTION OF THE INVENTION

As used herein, a heavy oil is an oil having an API gravity of less than or equal to 20.

The composition disclosed herein comprising a water soluble polymer and surface modified solids is useful for increasing the viscosity of an aqueous fluid.

The above composition further comprising an aqueous fluid is useful for producing oil from a subterranean formation. Although it is not likely that an emulsion would form in such a case, if some emulsion were to form, it would be an oil in water and not a water in oil emulsion.

To produce the surface modified solids, a mixture of heavy oil and solids is thermally treated for a time and at a temperature sufficient to produce oxidized polars from said heavy oil and to allow said oxidized polars to adsorb to the surface of said solids. Preferably, the solids and heavy oil will be mixed prior to and during the thermal treatment. Typically, the temperature will range from about 120 to about 220° C., preferably about 130° C. to about 180° C. The time may range from about 15 minutes to about 6 hours, preferably from about 3 to about 5 hours. During the thermal treatment, the mixture is purged with an oxygen source which may be oxygen, air or any other oxygen containing source. Typically, the air or oxygen purge will be conducted at a rate of about 20 to about 150 scfs/barrel (about 3.6 to about 27.3 $m^3/m^3$), preferably about 60 to 100 scfs/barrel (about 10.8 to 18 $m^3/m^3$) of heavy oil.

The solids may be selected from a variety of materials including inorganic and organic solids. For example, inorganic solids may include fumed silica, sold under the trade name of Aerosil 130, bentonite clays, divided or delaminated bentonite clay gel, kaolinite clays, and mixtures thereof. The organic solids may include, for example carbonaceous solids such as soot and coke fines, or mixtures thereof. The solids, if spherical are preferably in the size range of about 20 microns or less in diameter, more preferably less than 10 microns, even more preferably less than 5 microns, and most preferably about 2 microns or less, more specifically 100 nanometers or less. The solids, if non-spherical or spherical, preferably have a total surface area of about 1500 square microns or less. The preferred treat rate for the solids is 0.05 to 20.0 wt %, based on the weight of the oil, more preferably, about 0.1 to 2.0 wt %. The preferred materials are clays, specifically montmorillonite clays such as bentonite. Preferably, the clays will be a gel comprising delaminated or divided sheets of clay. The solid particles must also remain dispersed or undissolved in the oil. It is preferred that the solid particles are hydrophilic solids. The hydrophilicity of the solids can be determined by water wettability methods known in the art.

The solids utilized herein may exhibit a tendency to clump or aggregate prior to thermal treatment. The phenomena of aggregation is known in the art and its origin is attributed to primarily weak physical attraction forces. The size of the solids herein is the size of the individual isolated solid particle and not that of the aggregate. During the thermal treatment, the mixture of solids and heavy oil is mixed at elevated temperatures. The shearing forces accompanying the mixing at elevated temperatures are sufficient to de-aggregate the solids. If the solids are added post thermal treatment the mixture is subjected to high shear mixing preferably in the range of 7000 to 12000 rpm of the mixing paddle. It is preferred to add the solids prior to thermal treatment. Regardless of whether or not the solids utilized herein aggregate, the composition produced will exhibit improved properties.

The heavy oil used to prepare the surface modified solids of the invention can be oil of any type or composition, including but not limited to crude oil, refined oil, oil blends, chemically treated oils, resids, thermally treated oils, bitumen, synthetic hydrocarbon oils, and mixtures thereof. Preferably, the oil should contain a sufficient amount (at least about 0.5 wt % to about 40 wt %, preferably at least about 0.5 to about 13 wt %) of asphaltenes, polar hydrocarbons, polar resins, or mixtures thereof to enhance the solid-particle-oil interaction. Crude oil residuum that is obtained from the atmospheric pipestill or vacuum pipestill of a petroleum refinery is best suited for the invention. Heavy hydrocarbons like bitumen are also useful in preparing the compositions herein described.

Treating the mixture of oil and solid particles in the presence of a source of oxygen causes various reactions to occur in the oil and on the surface of the solid particles. The aromatic components of the oil that have benzyllic carbons and those that have fused rings that are oxidizable including, but not limited to naphthalene and anthracene, are oxidized to the corresponding acids, ketones or quinine products. Organo sulfur and nitrogen compounds present are oxidized to oxygenated compounds which may include sulfoxides and nitrogen oxides. The oxygenated compounds are more surface-active than the aromatic components themselves and absorb strongly on the surface of the solid particles to improve the physical properties of the composition. If naphthenic acids are present as salts of divalent cations like calcium, air oxidation can convert these salts to naphthenic acids and the corresponding metal oxide, for example calcium oxide. The free naphthenic acid can adsorb on the surface of the solids and also improve the physical properties of the composition. Thermal treatment with an oxygen source purge dehydrates the solid particles and thus modifies the solids' surface to improve its interaction with the surface-active components of oil (pre-existent in the oil or generated from air oxidation). The solid particles may be added before, during or after the thermal air oxidation step. However, it is preferred to add the solids to the oil and then oxidize the mixture.

If bentonite is used as the solid particle, it may be used in divided or delaminated form as a gel. Bentonite gel comprises bentonite and water. When the gel is added to the oil and subjected to the thermal treatment in the presence of an oxygen source, for example, air or oxygen, water is expelled from the reaction vessel as steam.

The thermal treatment reaction should be carried out until at least 80% of the water present in the mixture is expelled, preferably until 95% of the water is expelled, and even more preferably until 99% of the water is expelled.

The amount of solid particle added to the oil can vary in the range of about 1% to 30% based on the weight of the oil. At the higher concentrations, the mixture of solids and heavy oil will be a high solids content slurry. When divided bentonite gel is used as the carrier for the bentonite solid, the amount of gel added to the oil before oxidation can vary in the range of 5% to 95% of gel based on the weight of the oil. The weight of bentonite clay solids in the gel can vary from 1% to 30% based on the weight of the water. Bentonite clay gel can easily be prepared by delamination or peptization methods known in the art. An Introduction to Clay Colloid Chemistry by H. van Olphen second Edition John Wiley & Sons provides a description of peptizing and delamination methods practiced in the art.

Catalysts may be used to enhance the oxidation reaction. The oxidation catalyst may be selected from catalysts containing iron, nickel, manganese, and mixtures thereof. The catalyst can be added to the thermal treatment as finely divided metal or oil soluble metal salts such as iron naphthenate and can be used to catalyze oxidation rates and effect selectivity in the oxidation products. Such oxidation promoting catalysts and the techniques of using such catalysts are well known in the art. Oxidation can be conducted at elevated pressures of about 30 to about 100 psi (about 207 to about 690 kPa) to further catalyze the reaction rate and achieve product selectivity, however, oxidation at ambient pressures is preferred.

The heavy oil to solid ratio is preferred to be in the range of 2:8 to 1:9 by weight and the product of the thermal process is the surface modified clay. The surface modified clay has been characterized to be an amphiphilic solid that has intermediate water wettability. The interaction between the water-soluble polymer and amphiphilic surface modified clay results in a gel like microstructure exhibiting unique Theological properties with an increase in viscosity of the fluid.

Any water-soluble polymer capable of increasing the viscosity of water is suitable for the invention. Suitable polymers include, but are not limited to Xanthan gums, polyacrylic acid polymers, acrylamide and alkyl acrylamide polymers and mixtures thereof are some of the commonly used polymers in the art. The preferred polymer is Xanthan.

The composition comprising surface modified solids and water soluble polymer is prepared by combining water soluble polymer and surface modified solids together in any sequence. Typically, the surface modified solids will be added without separating them from the heavy oil used to produce them. In such a case, the treat rate of the solids and accompanying oil will be about 200 to 10,000 ppm based on the entire combination. The treat rate of the surface modified solid in the final combination, regardless of whether it is accompanied by any of the oil used to produce it will be 60 to 6000 ppm. The amount of water soluble polymer will be about 200 to about 10,000 ppm, preferably about 250–500 ppm based on the entire combination.

When the composition further comprises aqueous fluid, the aqueous fluid utilized will comprise or contain water and will be about 88 to about 99.91 wt % of the final combination. Preferably, the aqueous fluid will be water. However, it may also contain other solvents such as alcohols and salts. Hence, the aqueous fluid comprises water, or contains water and may also contain other components as well such as alcohols and salts.

If alcohols are used, the water to alcohol ratio can be in the range of 80:20 to 60:40 water:alcohol. It is preferable for the aqueous fluid to contain an amount of salt sufficient to provide a saline environment. Typically, the salts will be present in amounts of about 0.5 to about 5 wt % of the aqueous fluid. Suitable salts include sulfates, carbonates and chlorides of the Group I and IIa elements and mixtures thereof. For example sodium, potassium, and magnesium salts and mixtures thereof can be used.

The portion of the aqueous fluid comprising water, alcohol, and salts will equal 88 to 99.91 wt % of the final combination.

In another aspect of the invention, following formation of the surface modified solids, the solids will be washed with a suitable solvent to remove any residual oil therefrom. Suitable solvents include aromatic solvents having molecular weighs in the range of about 90 to about 250. For example, toluene, xylene, and mixtures thereof can be utilized. Mixtures of aromatic and aliphatic solvents may also be utilized.

As used herein, when disclosing the amounts or treat rates of the compositions components in terms of the aqueous fluid, the aqueous fluid includes all the components of the composition including the polymer and solids.

The surface modified clay has been characterized using IATRA scan chromatographic analyses, scanning electron microscopy and X-ray surface analyses. X-ray analyses reveal micron size clay particles whose surfaces contain carbonaceous adsorbates. The adsorbates have been identified by $C^{13}$ NMR and FTIR to be predominantly oxygenated aromatic compounds. Wettability experiments indicate the surface modified clays to be amphiphillic solids that exhibit intermediate water wettability. The interaction between the water soluble polymer and amphiphilic surface modified clay results in a gel like microstructure causing an increase in viscosity of the fluid.

The following examples are illustrative and not meant to be limiting in any way.

EXAMPLE 1

A mixture of 20 grams of Hoosier crude oil and 80 g of divided bentonite gel (providing an oil to gel ratio of 2:8 and with a bentonite solids concentration of 3.5 wt % in the gel) was heated to a temperature of 160° C. for 4 hours with an air purge of 80 scf/bbl/hour (14.4 $m^3/m^3$/hour). About 77 g of water was expelled from the reactor. After completion of reaction the product was tapped hot from the reactor. 1 gram of the product was dispersed as a slurry in 10 ml of Hoosier brine. This slurry was used in the preparation of the polymer-clay composition described below.

EXAMPLE 2

A 250 ppm solution of Xanthan polymer solution was made by dissolving the polymer in water containing 10% NaCl. To 98 ml (98 $cm^3$) of this solution was added 2 ml (2 $cm^3$) of surface modified bentonite clay slurry described above and mixed using a Silverson mixture at 100 rpm. The total weight of surface modified solids in the polymer-clay composition was 0.028 wt % based on the weight of water. Low shear mixing is preferred since at high shear polymer degradation is likely. The polymer-surface modified clay composition and the polymer solution prior to surface modified clay addition were subjected to rheological analyses. FIG. 1 is a viscosity as a function of shear rate plot for the two fluids at 25° C. The polymer solution is very weakly shear thinning and exhibits a viscosity of 2.5 cP (0.0025 Pa·s) at 8.6 sec−1. In contrast, the polymer-surface modified clay fluid exhibits unique shear thickening behavior. As a function of shear rate, an increase in viscosity followed by a sharp decrease and then an increase is observed. Such a Theological property for a polymer fluid is unprecedented in the art. At 8.6 $sec^{-1}$ the polymer-surface modified clay composition has a viscosity of 16.3 cP (0.163 Pa·s) indicating an 8 fold increase in viscosity of the fluid due to addition of surface modified clay.

EXAMPLE 3

In an another experiment, the surface modified clay with no polymer was tested. A 0.07 wt % surface modified clay solids in Hoosier brine was prepared by adding 5 ml (5 $cm^3$) of the solution prepared in Example 1 to 95 ml (95 $cm^3$) of Hoosier brine. Viscosity as a function of shear profile for this composition is shown in FIG. 2. Compared to the 250 ppm Xanthan polymer solution the surface modified clay slurry exhibits a substantially higher viscosity at low shear rates and the fluid is strongly shear thinning.

What is claimed is:

1. A composition comprising a combination of
   (a) a water-soluble polymer;
   (b) surface modified solids wherein said solids are selected from inorganic and organic solids selected from the group consisting of fumed silica, bentonite clays, divided or delaminated bentonite clay gel, kaolinite clays, coke fines, soot and mixtures thereof and wherein said surface modification comprises polar air oxidized hydrocarbons of a heavy oil adsorbed on the surface of said solids and wherein said surface modified solids may include an amount of said heavy oil; and
   (c) optionally an aqueous fluid comprising water.

2. The composition of claim 1 wherein said inorganic solid is bentonite.

3. The composition of claim 2 wherein said bentonite is a bentonite gel.

4. The composition of claim 3 wherein said bentonite gel is divided or delaminated.

5. The composition of claim 1 wherein said heavy oil is selected from the group consisting of crude oil, refined oil, thermally treated oil, chemically treated oil, crude oil residuum, bitumen, synthetic hydrocarbon oils, and mixtures thereof.

6. The composition of claim 1 wherein said polymer is selected from the group consisting of Xanthan gums, polyacrylic acid polymers, acrylamide and alkyl acrylamide polymers.

7. The composition of claim 1 wherein said aqueous fluid further comprises water soluble salts selected from the group consisting of chloride, sulfate, carbonate salts of Group 1 and 2a elements and mixtures thereof.

8. The composition of claim 1 wherein said solids are spherical or non-spherical.

9. The composition claim 1 wherein when said solids at spherical they have a diameter of about 20 microns or less.

10. The composition of claim 1 wherein said solids have a total surface area of about 1500 square microns or less.

11. The composition of claim 1 wherein said aqueous fluid if present comprises 88 to 99.91 wt % of said composition.

12. The composition of claim 1 wherein said solid and oil comprise about 200 to about 10,000 ppm of said composition.

13. The composition of claim 1 wherein said polymer comprises about 200 to about 10,000 ppm of said composition.

14. A method for increasing the viscosity of an aqueous fluid wherein said aqueous fluid comprises water comprising the steps of:
   adding to said aqueous fluid a water soluble polymer and surface modified solids wherein said solids are selected from inorganic and organic solids selected from the group consisting of fumed silica, bentonite clays, divided or delaminated bentonite clay gel, kaolinite clays, coke fines, soot and mixtures thereof and wherein said surface modification comprises air oxidized polars of a heavy oil adsorbed on the surface of said solids and wherein said surface modified solids may include an amount of said heavy oil.

15. A method of producing a composition of matter said method comprising
   (a) thermally treating a mixture of heavy oil and solids wherein said solids have a total surface area of about 1500 square microns or less in the presence of oxygen for a time and at a temperature sufficient to produce oxidized polars from said heavy oil and to allow said oxidized polars to adsorb onto the surface of said solids wherein said adsorption achieves at least 50% coverage;
   (b) combining at least a portion of said as produced surface modified solids and said heavy oil of step (a) with a water-soluble polymer and optionally an aqueous fluid comprising water.

16. The method of claim 15, wherein said thermal treatment is conducted at a temperature of about 120 to about 220° C.

17. The method of claim 15, wherein said thermal treatment is conducted in the presence of an oxidation catalyst.

18. The method of claim 17 wherein said oxidation catalyst is selected from a catalyst containing iron, manganese, nickel or mixtures thereof.

19. The method of claim 16, wherein said solid particles are present in said heavy oil in the range of about 0.05 to 20 wt % based on the weight of oil.

20. The method of claim 16 wherein the solids are added to the oil as a gel or slurry.

21. The method of claim 19 wherein said gel comprises about 1 to about 10 wt % clay solids and about 90 to about 99 wt % water.

22. The method of claim 16 wherein said surface modified solids are separated from said heavy oil and said separated surface modified solids are combined with said water soluble polymer.

23. A composition prepared by a process comprising
   (a) thermally treating a mixture of heavy oil and solids wherein said solids are selected from inorganic and organic solids selected from the group consisting of fumed silica, bentonite clays, divided or delaminated bentonite clay gel, kaolinite clays, coke fines, soot and mixtures thereof and wherein said solids have a total surface area of about 1500 square microns or less, in the presence of oxygen for a time and at a temperature sufficient to produce polar oxidized hydrocarbons from said heavy oil and to allow said polar oxidized hydrocarbons to adsorb onto the surface of said solids wherein said adsorption achieves at least 50% coverage;
   (b) combining at least a portion of said as produced surface modified solids and said oil of step (a) with a water-soluble polymer and optionally an aqueous fluid comprising water.

24. The composition of claim 23 wherein said surface modified solids are separated from said heavy oil and only said surface modified solids are combined with said aqueous fluid.

25. A method for recovering hydrocarbons from a subterranean formation, said method comprising the steps of:
   (a) injecting into said subterranean formation a composition comprising an aqueous fluid comprising water, a water soluble polymer and surface modified solids, wherein said solids are selected from inorganic and organic solids selected from the group consisting of fumed silica, bentonite clays, divided or delaminated bentonite clay gel, kaolinite clays, coke fines, soot and mixtures thereof and wherein said surface modification comprised polar air oxidized hydrocarbons of a heavy oil adsorbed onto the surface of said solids;
   (b) recovering hydrocarbons form said subterranean hydrocarbon formation;
   and wherein said composition has a viscosity at least two times greater than the viscosity of the hydrocarbons being recovered from said subterranean hydrocarbon formation.

* * * * *